March 11, 1952 M. D. NELSON 2,588,652

HIGH-VOLTAGE SUPPLY

Filed Feb. 17, 1951

INVENTOR
Morris D. Nelson
BY
ATTORNEY

Patented Mar. 11, 1952

2,588,652

UNITED STATES PATENT OFFICE 2,588,652

HIGH-VOLTAGE SUPPLY

Morris D. Nelson, Bronx, N. Y., assignor to Radio Corporation of America, a corporation of Delaware Application February 17, 1951, Serial No. 211,497

2 Claims. (Cl. 315—14)

Figures 1, 2:
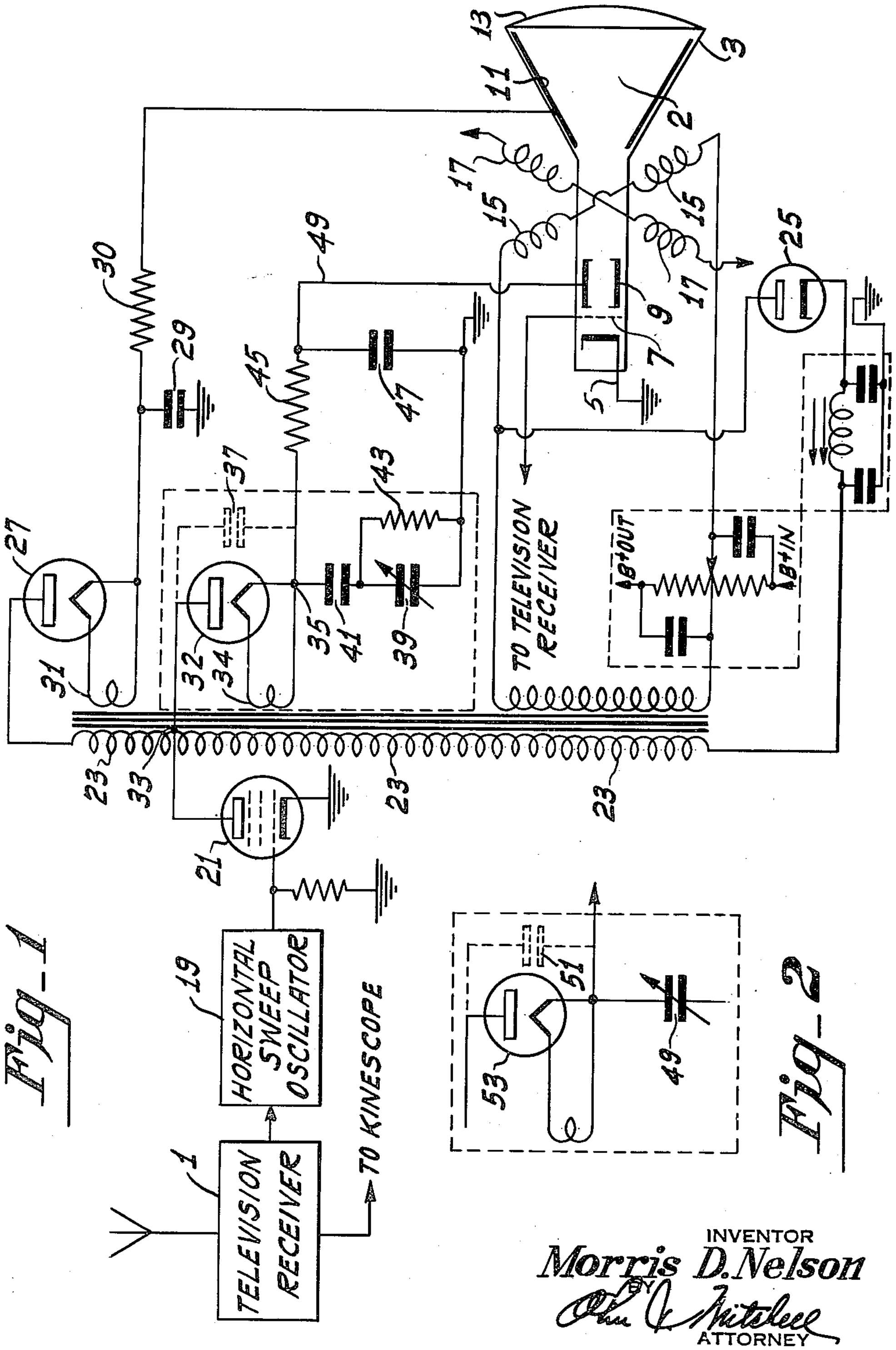

This invention relates to variable high voltage supply systems, and particularly, to systems for supplying an adjustable voltage of high magnitude between the cathode and another electrode of a cathode ray tube.

In apparatus employing cathode ray tubes of the electrostatic focusing type, it is customary to apply very high unidirectional positive potential to the second anode and a somewhat lower, adjustable, unidirectional positive potential to the first or focusing anode of the cathode ray tube. The first anode potential is made adjustable so that the cathode beam may be brought into focus. Thus, in a television receiver employing an electrostatically focused cathode ray tube, the "focus" adjustment in effect varies the potential impressed upon the first or focusing anode.

Heretofore it has been the usual practice to obtain the focusing potential by means of a conventional potentiometer voltage divider. Such a potentiometer arrangement is expensive, involves difficulties in insulating it for the high voltages involved and has the further disadvantages of drawing an apreciable amount of current thereby draining power from the source, and of giving poor voltage regulation.

It is accordingly one object of this invention to provide an improved method of and means for obtaining an adjustable unidirectional high voltage.

It is another object of this invention to provide an improved method of and means for obtaining an adjustable unidirectional high voltage for the focusing anode of a cathode ray tube.

A further object of this invention is to provide an improved means for controlling the amplitude of a unidirectional voltage which produces a minimum load on the voltage source.

According to the invention, a high A. C. potential is adjusted by means of a reactance voltage divider, one element of which is the interelectrode capacitance of a rectifier, and the other a small and inexpensive variable reactor. This adjusted A. C. potential is rectified and applied to the focusing anode.

Other and incidental objects of this invention will be apparent to those skilled in the art from a reading of the following specification and an inspection of the accompanying drawing, in which:

Figure 1 is a schematic representation of a cathode ray tube power supply circuit embodying the invention, and Figure 2 is a schematic representation of a modification of the capacitance voltage divider shown in Figure 1.

Referring to Figure 1, this invention is shown applied to a television receiver 1 which includes an electrostatic focus picture tube 2. The particular picture tube illustrated is of a well known type comprising an evacuated envelope 3 having an electron gun therein which comprises a cathode 5, a control grid 7, and a first or focusing anode 9. A second anode 11, consisting of conductive coating on the inside of the envelope 3, is provided for accelerating the electrons and for aiding in electrostatic focusing. The usual fluorescent screen 13 is provided at the large end of the tube.

In accordance with common practice, the picture tube is provided with one pair of deflecting coils 15 for deflecting the electron beam horizontally, and another pair of deflecting coils 17 for deflecting the electron beam vertically, whereby the fluorescent screen 13 may be scanned to produce a picture. Details relating to the television receiver and vertical deflection are not illustrated as any of the usual types may be employed, such as, for example, those shown and described in an article by A. Wright in RCA Review for March 1947.

A horizontal sweep oscillator 19 supplies a saw tooth potential to the grid of the horizontal sweep output tube 21, which in turn supplies a saw tooth current component to the output transformer 23. During the horizontal trace the deflection current increases linearly in the horizontal deflection coils 15, and a corresponding magnetic field is produced. During the retrace period the output tube 21 is cut off, and the sudden removal of plate current causes a sudden collapse of the magnetic field. This collapse in turn causes a high amplitude transient voltage pulse to appear across the horizontal deflection coils 15. A damper tube 25 prevents this transient voltage pulse from setting up a series of oscillations.

This high amplitude pulse which has a peak amplitude of the order of several thousand volts, is stepped up by the horizontal output transformer 23. A high voltage rectifier 27 is connected between the high voltage terminal of transformer 23 and the second anode 11 of cathode ray tube 2. The high voltage rectifier 27 rectifies this transient voltage to produce, after filtering by capacitor 29 and a resistor 30, a constant high unidirectional potential.

The filament of the high voltage rectifier 27 is energized by means of a few turns of wire 31 wound on the core of the horizontal output transformer 23.

According to the present invention, the first or focusing anode potential, which must be adjustable, is obtained in a somewhat similar fashion. A high voltage rectifier 32 has its plate connected to tap 33 of the horizontal output transformer 23. The filament of rectifier 32 is energized in the same fashion as that of rectifier 27 by means of conductors 34.

According to the invention the adjustable focusing potential is obtained by rectifying the component of A. C. potential across rectifier 32, whose interelectrode capacity is part of the adjustable reactance voltage divider. A capacitor can thus be eliminated, and a saving effected in manufacturing cost.

The capacitance voltage divider shown in Figure 1 operates as follows:

The unidirectional output voltage is determined by the difference of potential between point 33 and point 35. The potential at point 35 is itself determined by the relative values of interelectrode capacitance 37 of rectifier 32, and of variable capacitor 39, these two capacitors forming a capacitance voltage divider. Capacitor 41 serves to block the direct current, so that capacitor 39 will have a lower voltage impressed across it. It is desirable to place a high value resistor 43 in parallel with capacitor 39 to prevent the build up of a charge from capacitor leakage. Resistor 45 and capacitor 47 filter the output of rectifier 32. That filtered output is applied to the first or focusing anode 9 of tube 2 by means of lead 49. Capacitor 41 is large in comparison to capacitances 37 and 39, so that the A. C. voltage drop across it is negligible.

The following is a numerical example illustrating the operation of the capacitance divider circuit shown in Figure 1. Let us assume the following values of circuit components: Peak plate voltage of rectifier 32, 6000 volts; interelectrode capacitance 37 of rectifier 32, 1 mmf.; variable capacitor 39, 1 to 8 mmf.; capacitors 41 and 47, 500 mmf.

At the minimum value of the variable capacitor 39, the potential at the cathode of rectifier 32 will be $$6000\frac{1/1}{1/1+1/500+1/1}=2997 \text{ volts}$$

At the maximum value of variable capacitor 39, the potential at the cathode of rectifier 32 will be $$6000\frac{1/1}{1/1+1/500+1/8}=5324 \text{ volts}$$

Referring now to Figure 2, a simpler form of voltage divider circuit is illustrated. Capacitor 41 and resistor 43 have been eliminated from the circuit, and a high voltage capacitor 49 of a tubular type is used in the variable divider circuit, the other element of which is the interelectrode capacitance 51 of rectifier 53. Capacitor 49 has to withstand a higher voltage than did capacitor 39, as there is a unidirectional potential across it which was formerly blocked by capacitor 41.

The following is a numerical example of the operation of the capacitance voltage divider circuit shown in Figure 2. Let us assume the following circuit values: Peak plate voltage of rectifier 53, 6000 volts; interelectrode capacitance 51 of rectifier 53, 1 mmf.; and variable capacitance 49, 1 to 8 mmf.

At the minimum value of the variable capacitance 49, the potential at the cathode of rectifier 53 will be $$6000\frac{1/1}{1/1+1/1}=3000 \text{ volts}$$

At the maximum value of the variable capacitor 49, the potential at the cathode of rectifier 53 will be $$6000\frac{1/1}{1/1+1/8}=5333 \text{ volts}$$

If the normal focusing anode potential is 4000 volts, it will be seen that in both the above cases a variation of + or −1000 volts can thus be obtained.

This focusing voltage range is obtained with the use of small inexpensive capacitors. In the embodiment of applicant's invention shown in Figure 2, the voltage adjustment is accomplished by a single small variable tubular capacitor of a very cheap variety.

The applicant's invention avoids the use of an expensive potentiometer arrangement. The saving effected is substantial, and all the more valuable since applicant's invention finds its application in a field where production in great quantities is the general rule. A further advantage of applicant's invention is that the circuit arrangement disclosed drains less power than would a potentiometer arrangement. Better voltage regulation is also obtained.

Although applicant's invention has been described in connection with a pulse type power supply, it will be evident to those skilled in the art that the voltage divider arrangement disclosed can be applied to an R.-F. type power supply without departing from the spirit of the invention.

Having thus described my invention, what is claimed is:

1. A high voltage power supply for an electrostatically focused cathode ray tube comprising a first anode and a second anode, said high voltage power supply comprising a transformer having connecting points thereon, a first rectifier having an anode and a cathode, means connecting the anode of said first rectifier to a first connecting point on said transformer, means connecting the cathode of said first rectifier to the second anode of said cathode ray tube, a second rectifier having first and second electrodes, means connecting the first electrode of said second rectifier to a second connecting point on said transformer, means connecting the second electrode of said second rectifier to the first anode of said cathode ray tube, a reactance voltage divider comprising two reactance elements, one of said reactance elements comprising the interelectrode reactance of said second rectifier, and the other of said elements comprising a variable reactance connected between the second electrode of said second rectifier and ground.

2. A high voltage power supply for an electrostatically focused cathode ray tube comprising a first anode and a second anode, said high voltage power supply comprising a transformer having connecting points thereon, a first rectifier having an anode and a cathode, means connecting the anode of said first rectifier to a first connecting point on said transformer, means connecting the cathode of said first rectifier to the second anode of said cathode ray tube, a second rectifier having first and second electrodes, means connecting the first electrode of said second rectifier to a second connecting point on said transformer, means connecting the second electrode of said second rectifier to the first anode of said cathode ray tube, a capacitance voltage divider comprising two capacitance elements, one of said capacitance elements comprising the interelectrode capacitance of said second rectifier, and the other of said elements comprising a variable capacitor connected between the second electrode of said second rectifier and ground.

MORRIS D. NELSON.

REFERENCES CITED

The following references are of record in the file of this patent:

UNITED STATES PATENTS

| Number | Name | Date |
|---|---|---|
| 2,188,647 | Busse | Jan. 30, 1940 |
| 2,218,764 | Moller et al. | Oct. 22, 1940 |
| 2,246,291 | Bull | June 17, 1941 |

FOREIGN PATENTS

| Number | Country | Date |
|---|---|---|
| 606,371 | Great Britain | Aug. 12, 1948 |